United States Patent [19]

Pramstraller

[11] 4,050,815

[45] Sept. 27, 1977

[54] PHOTOGRAPHIC ENLARGING APPARATUS WITH HINGED IMAGE HOLDER

[75] Inventor: Wilmuth Pramsträller, Brixen near Bozen, Italy

[73] Assignee: Durst S.p.A. Fabbrica Macchine ed Apparecchi Fototechnici, Balzano-Bozen, Italy

[21] Appl. No.: 740,975

[22] Filed: Nov. 11, 1976

[30] Foreign Application Priority Data

Nov. 13, 1975 Italy .................................. 6721/75

[51] Int. Cl.² ................. G03B 27/62; G03B 27/52
[52] U.S. Cl. ........................................ 355/75; 355/63
[58] Field of Search ................................ 355/75, 63

[56] References Cited

U.S. PATENT DOCUMENTS

| 2,236,303 | 3/1941 | Skinner et al. ............ 355/63 |
| 2,294,585 | 9/1942 | Thomson ............. 355/63 X |
| 2,518,727 | 8/1950 | Simmons ............. 355/63 X |

FOREIGN PATENT DOCUMENTS 516,523  2/1955  Italy ........................ 355/75

Primary Examiner—Donald A. Griffin
Attorney, Agent, or Firm—Connolly and Hutz

[57] ABSTRACT

The hinged image holder of a photographic enlarger has its upper portion loosely attached to the lamp housing so that it is automatically opened for inserting and removing original images when the lamp housing is moved away from the rest of the enlarger. The lamp housing may be hinged or move parallel to the rest of the enlarger. The upper part of the holder is loosely attached to the lamp housing by variously shaped clips or slots which engage corresponding portions on the lamp housing.

6 Claims, 4 Drawing Figures

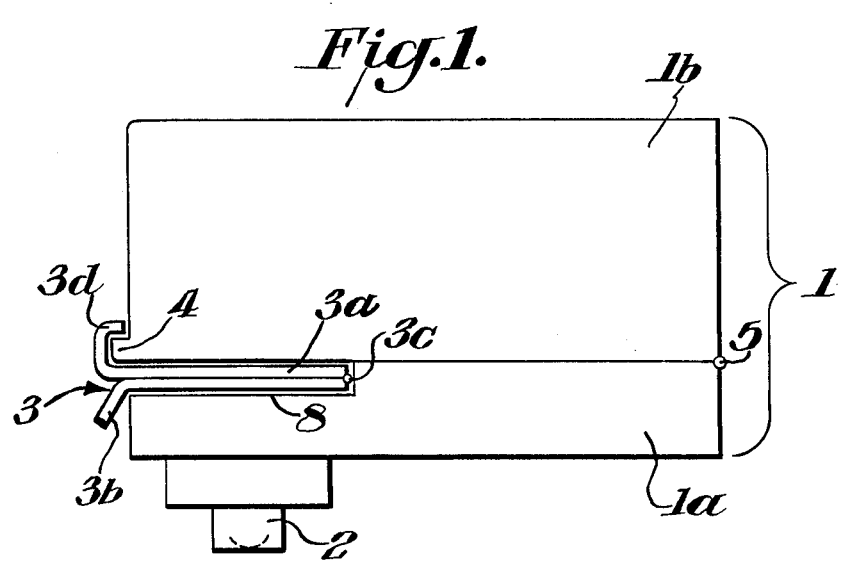
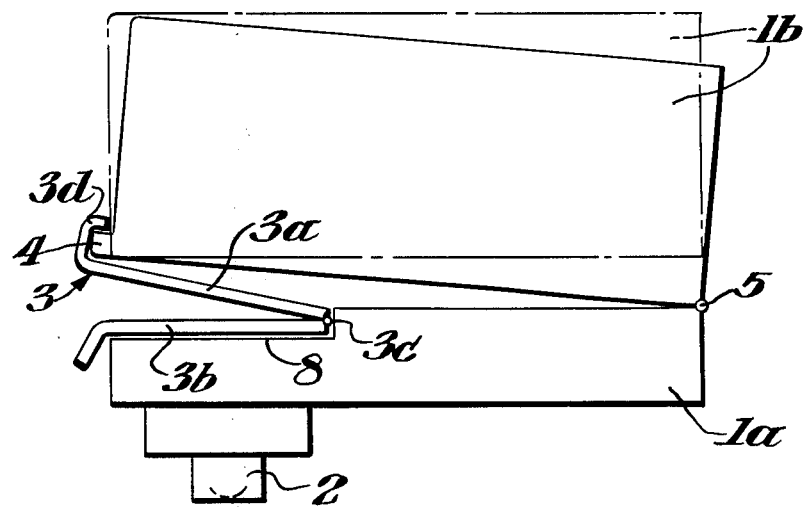
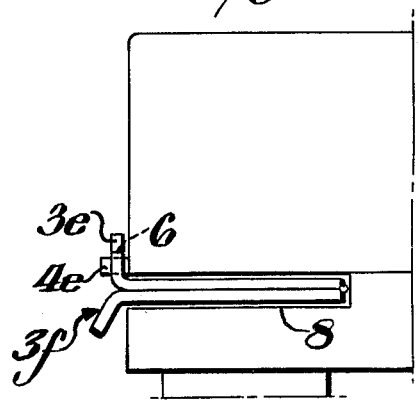
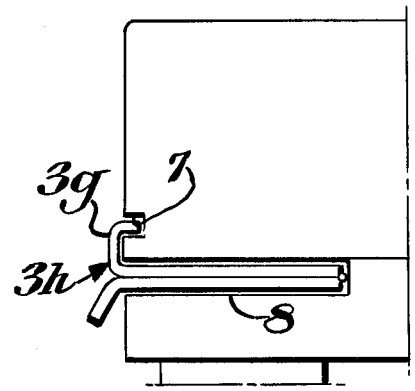

PHOTOGRAPHIC ENLARGING APPARATUS WITH HINGED IMAGE HOLDER

Background of the Invention

This invention relates to a photographic enlarging apparatus with hinged image holder and with a lamp housing normally movable towards and away from the plane of the holder.

In enlarging apparatus of this type, the original image to be copied is inserted between two hinged parts of an image holder, which is insertable between a lens holder and a lamp housing, which is removable from the lens holder. In an operating condition of the enlarging apparatus, the lamp housing by its weight exerts a pressure on the holder and thereby assures the flattening of the inserted picture original. For the insertion and alignment of the picture originals, the lamp housing is raised away from the lens holder, and the holder is swung open or removed from its seat. The raising of the lamp housing takes place by the actuation of a suitable eccentric or lever drive. If the holder is left in the enlarging apparatus upon insertion and alignment, it must be held with one hand by the operator in a swung-open position, so that only one hand remains free for the insertion and alignment work, something which is very uncomfortable and requires a certain dexterity.

An object of the invention is to provide an enlarging apparatus of the initially mentioned type, whereby the operating convenience is improved by the simplest means and the abovementioned drawback is avoided.

SUMMARY OF THE INVENTION

The hinged image holder of a photographic enlarger has its upper portion loosely attached to the lamp housing so that it is automatically opened for inserting and removing original images when the lamp housing is moved away from the rest of the enlarger. The lamp housing may be hinged or move parallel to the enlarger. The upper part of the holder may be loosely attached to the lamp housing by variously shaped clips or slots which engage corresponding portions on the lamp housing.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a side view in elevation of the projection head of a photographic enlarger incorporating one embodiment of this invention in the closed position;

FIG. 2 is a side view in elevation similar to FIG. 1 in the opened position and with an alternate open position shown in broken outline;

FIG. 3 is a fragmental side view in elevation of a photographic enlarging apparatus incorporating another embodiment of this invention; and FIG. 4 is a further fragmental view in elevation showing a portion of a photographic enlarger incorporating a further embodiment of this invention.

DESCRIPTION OF THE PREFERRED EMBODIMENTS

A projection head 1, movable along a (non-illustrated) column, of an enlarging apparatus consists of two parts, separable from each other: a lens holder 1a, wherein a lens 2 is mounted generally in a movable manner, and a lamp housing 1b, wherein a (non-illustrated) light source is situated. Above lens 2 and between lens holder 1a and lamp housing 1b, image holder 3, consisting of two hinged parts 3a and 3b and hinge 3c, is inserted. Projectable picture originals may be placed within holder 3. The upper edge of upper holder portion 3a shown in cross section, is bent in a U-shaped clip 3d. Upon the insertion of holder 3 into recess 8 in the projection head, this U-shaped clip section 3d of holder 3 loosely overlaps a projection 4 of the lamp housing 1b. If lamp housing 1b, as illustrated in FIG. 2, is raised from the lens holder 1a, this projection 4 enters into an operating connection with the U-shaped clip section 3d of aperture 3, so that the holder 3 is automatically swung open without necessitating any special manipulation by the operator.

The raising of the lamp housing 1b can occur in various ways. In the exemplary embodiment illustrated, lamp housing 1b is pivoted normally toward the aperture plane about an axis of rotation 5. Such pivoting movement is produced in a known manner by a (non-illustrated) lever, mounted on the projecting head, or by an eccentric drive. Lamp housing 1b, however, can be removed from the aperture parallel thereto, as shown in FIG. 2 by broken lines, the raising movement taking place by actuating means mounted on the projecting head.

The operating connection between the upper part 3a of holder 3 and projection 4 of lamp housing 1b may equally be achieved in a manner other than that illustrated in FIGS. 1 and 2. For example, the upper edge portion of the aperture may be bent in an L-shaped clip 3e, as shown in FIG. 3, and a projection 4e in FIG. 3 analogous to projection 4, which is narrower than the holder 3f, may engage in a slot 6 provided in its bent section.

The same result is achieved if the U-shaped clip 3g of the holder 3h, shown in FIG. 4, engages in a recess 7 in the projecting head.

Feasible are also other means analogous to those described by means of which the operating connection illustrated may be produced. In particular, the upper edge portion of the aperture may be only partially bent into a U or an L shape and the corresponding projection or recess in the projecting head may have the most varied dimensions.

By a respective actuation of drive elements, (not shown), the lamp housing 1b is brought back again into the original position, illustrated in FIG. 1. With a closed holder 3, the lamp housing exerts a pressure thereon either by the force of gravity or by the force of respectively mounted springs, which can be provided particularly when the projection head is designed to be rotatable for purposes of conversion or for horizontal projection, and thus can also assume a non-vertical position.

I claim:

1. An image holding arrangement for a photographic enlarger having a lamp housing and a lens compartment separate from each other, movable means connecting the lamp housing to the lens holding compartment for movement of the lamp housing away from and towards the lens holding compartment, a hinged image holder disposed between adjacent portions of the lamp housing and lens holding compartment, the image holder having substantially flat upper and lower portions hinged to each other, and loose coupling means connecting the upper portion of the image holder to the lamp housing whereby movement of the lamp housing away from the lens holder automatically opens the image holder for insertion and removal of image material.

2. An arrangement as set forth in claim 1 wherein the loose coupling means comprises a bent clip on the upper portion of the image holder, and a projection on the lamp housing loosely engaged by the bent clip.

3. An arrangement as set forth in claim 2 wherein the bent clip comprises an L-shaped clip.

4. An arrangement as set forth in claim 2 wherein the bent clip comprises a U-shaped clip.

5. An arrangement as set forth in claim 1 wherein the loose coupling comprises an apertured clip on the top of the image holder and a projection on the lamp housing.

6. An arrangement as set forth in claim 1 wherein the loose coupling comprises a slot in the upper portion of the image holder and a projection on the lamp housing which loosely engages the slot.

* * * * *

UNITED STATES PATENT AND TRADEMARK OFFICE
CERTIFICATE OF CORRECTION

PATENT NO. : 4,050,815
DATED : September 27, 1977
INVENTOR(S) : Wilmuth Pramstraller It is certified that error appears in the above-identified patent and that said Letters Patent are hereby corrected as shown below:

Cover Page, column 1, change the following

"[75] Inventor: Wilmuth Pramstrüller, Brixen near Bozen, Italy"

to

-- [75] Inventor: Wilmuth Pramstraller, Brixen near Bozen, Italy --

Cover page, column 1, change the following

"[73] Assignee: Durst S.p.A. Fabbrica Macchine ed Apparecchi Fototechnici, Balzano-Bozen, Italy"

to

-- [73] Assignee: Durst S.p.A. Fabbrica Macchine ed Apparecchi Fototechnici, Bolzano-Bozen, Italy --

Signed and Sealed this

Fourteenth Day of March 1978

[SEAL]

Attest:

RUTH C. MASON
Attesting Officer

LUTRELLE F. PARKER
Acting Commissioner of Patents and Trademarks